(12) United States Patent
Shimoi et al.

(10) Patent No.: US 6,471,807 B1
(45) Date of Patent: Oct. 29, 2002

(54) PROCESS FOR PRODUCING DRY CLUTCH FACING

(75) Inventors: Hiroji Shimoi; Tadashi Yamaguchi; Toru Ooishi, all of Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 22 days.

(21) Appl. No.: 09/599,254

(22) Filed: Jun. 23, 2000

(30) Foreign Application Priority Data

Jun. 24, 1999 (JP) .......................................... 11-178678

(51) Int. Cl.$^7$ .............................................. B65H 81/00
(52) U.S. Cl. ........................ 156/175; 156/173; 156/242; 156/245
(58) Field of Search ................................. 156/245, 242, 156/173, 175

(56) References Cited

U.S. PATENT DOCUMENTS

| | | |
|---|---|---|
| 2,546,056 A | 3/1951 | Batchelor |
| 5,098,758 A | 3/1992 | Kani |
| 5,114,769 A | 5/1992 | Kani et al. |
| 6,022,502 A | * 2/2000 | Lockhart et al. ............ 264/113 |

FOREIGN PATENT DOCUMENTS

EP          0147846 A2       7/1985

* cited by examiner

*Primary Examiner*—Jeff H. Aftergut
(74) *Attorney, Agent, or Firm*—Arent Fox Kintner Plotkin & Kahn, PLLC

(57) ABSTRACT

A dry clutch facing includes a facing element which is comprised of a roving wound into a volute shape and impregnated with a rubber, a thermosetting resin and a friction improving agent. The dry clutch facing also includes a reinforcing element which includes a matrix formed of a thermosetting resin and a reinforcing fiber dispersed in the matrix. The reinforcing element is bonded to the back of the facing element and placed in contact with a cushion spring. A peculiar distortion caused by the volute shape winding and a wearing on the back side by the cushion spring can be inhibited largely.

1 Claim, 8 Drawing Sheets

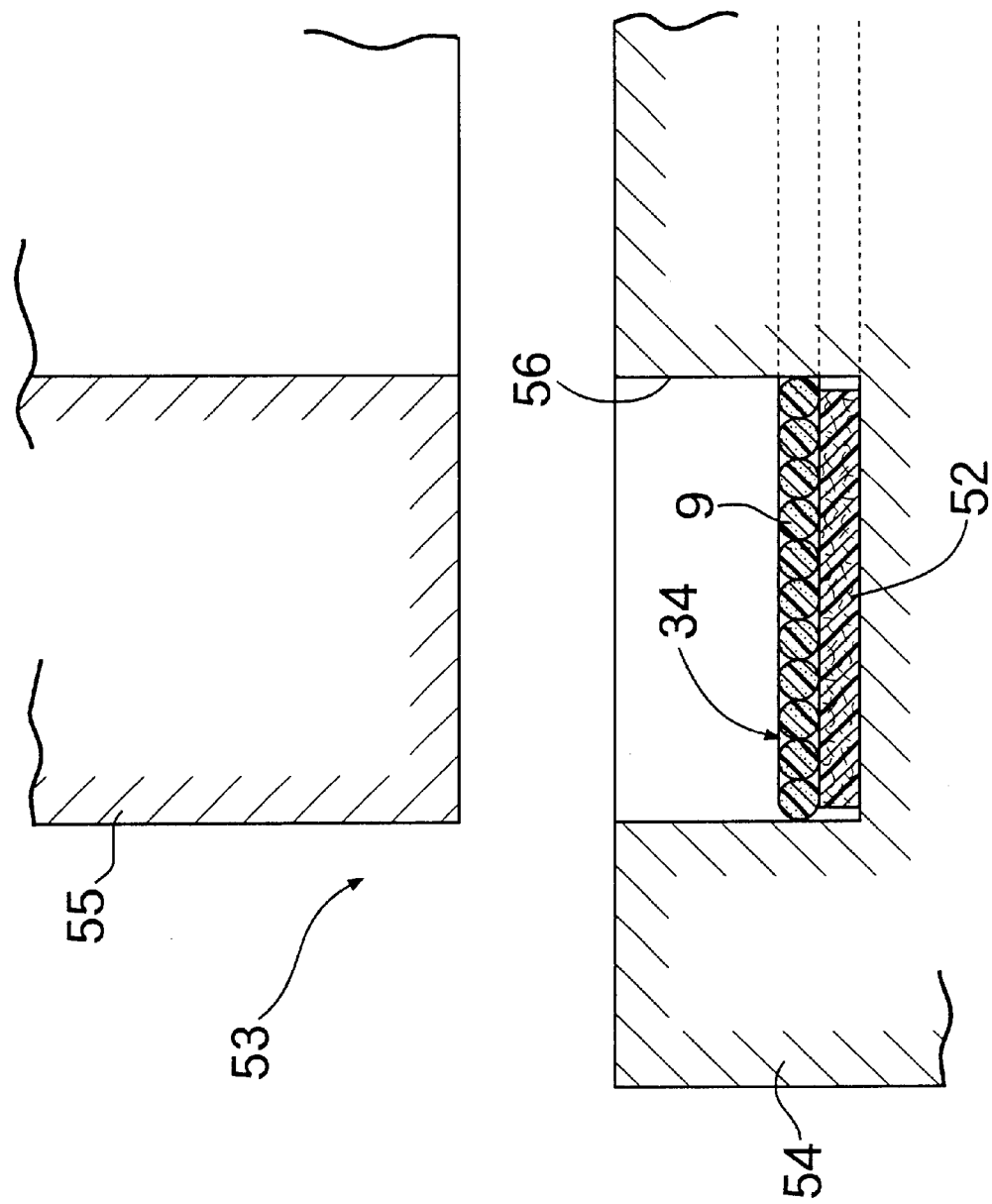

PROCESS FOR PRODUCING DRY CLUTCH FACING

BACKGROUND OF THE INVENTION

1. Field of the Invention

The present invention relates to a dry clutch facing, e.g., a clutch facing for a dry friction clutch used in a vehicle such as an automobile, and a process for producing such clutch facing.

2. Description of the Related Art

A clutch facing of the mentioned type is conventionally produced through a spirally winding step of winding into a volute shape a continuous fiber material including a rubber, an uncured thermosetting resin, a friction improving agent and the like, e.g., a roving. This clutch facing may be used in a clutch disk of a separate cushion type in which for example, a plurality of cushion springs are riveted to a disk plate in order to smoothen the engagement of the clutch.

In the clutch facing made through the spirally winding step as described above, however, a peculiar distortion may be generated after the production of the clutch facing in some cases. In such a case, a curing operation must be carried out, resulting in an inevitable increase in manufacture cost. When a clutch disk as described above is used severely, each clutch facing may be worn at its back due to the friction contact with the cushion springs.

SUMMARY OF THE INVENTION

Accordingly, it is an object of the present invention to provide a dry clutch facing of the above-described type, wherein the distortion and the wearing of the back can be inhibited considerably.

To achieve the above object, according to the present invention, there is provided a dry clutch facing, comprising a facing element which is comprised of a continuous fiber material which is wound into a volute shape and impregnated with a rubber, a thermosetting resin and a friction improving agent, and a reinforcing element which includes a matrix formed of a thermosetting resin, and a reinforcing short fiber dispersed uniformly and at random in the matrix, the reinforcing element being bonded to a back of the facing element and placed in contact with a cushion spring.

With the above arrangement, the reinforcing element hardly generates distortion. Therefore, even if a distortion is generated in the facing element, such distortion is inhibited remarkably due to a backing effect provided by the reinforcing element. In a separate cushion-type disk, the cushion spring is placed in contact with the reinforcing element of each clutch facing. Therefore, even if a friction contact is produced between the cushion spring and each clutch facing under severe service conditions, the wearing of each clutch facing is inhibited considerably. This also applies to a plate cushion-type clutch disk in which a disk plate itself also serves as a cushion spring.

The reinforcing element bears the strength of the dry clutch facing. Therefore, it is possible to moderate the strength condition in the facing element and to widen the range of regulation of the friction characteristic. Thus, the dry clutch facing has a friction characteristic suited to detailed market needs.

It is another object of the present invention to provide a producing process of the above-described type, which is capable of mass-producing a dry clutch facing of the above-described type.

To achieve the above other object, according to the present invention, there is provided a process for producing a dry clutch facing, comprising the steps of:

forming an annular preform for a facing element through a step of winding a continuous fiber material including a rubber, an uncured thermosetting resin and a friction improving agent into a volute shape;

forming an annular preform for a reinforcing element through a step of heating, under a pressure, an annular accumulated material which includes a reinforcing short fiber and a resin powder of an uncured thermosetting resin, the reinforcing short fiber being dispersed uniformly and at random in the entire resin powder; and superposing both the annular preforms one on another and heating the annular preforms under a pressure, thereby producing a facing element and a reinforcing element and at the same time, bonding both the facing and reinforcing elements to each other.

When such process is employed, a dry clutch facing having an arrangement as described above can be produced efficiently on a mass-production scale.

The above and other objects, features and advantages of the invent ion will become apparent from the following description of the preferred embodiment taken in conjunction with the accompanying drawings.

BRIEF DESCRIPTION OF THE DRAWINGS

FIG. 10 is a schematic view of an essential portion of a hot press forming apparatus for producing a clutch facing.

DESCRIPTION OF THE PREFERRED EMBODIMENTS

The present invention will now be described by way of embodiments with reference to the accompanying drawings.

Figure 1:
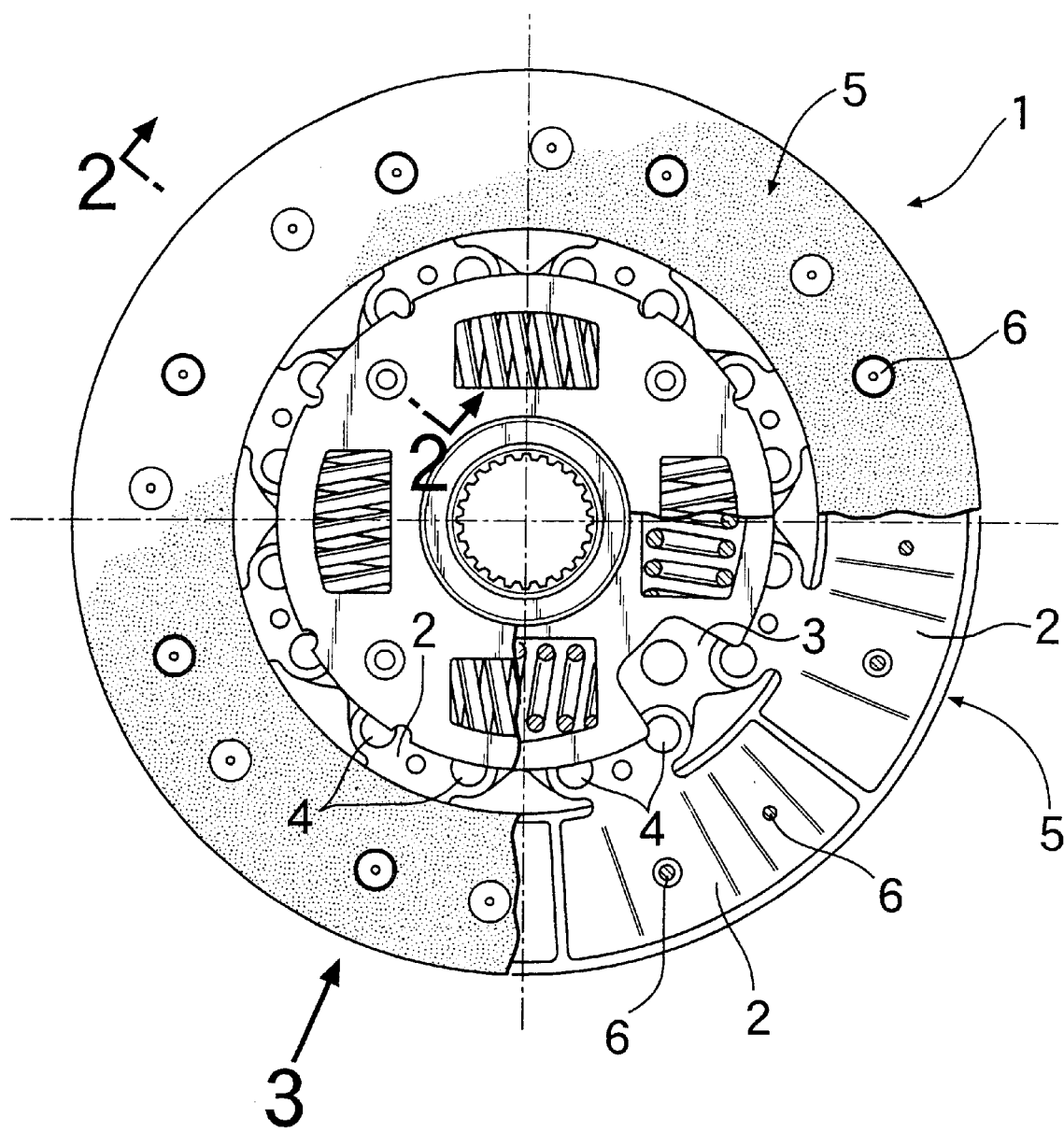
FIG. 1 is a cutaway front view of an essential portion of a clutch disk.
Figure 2:
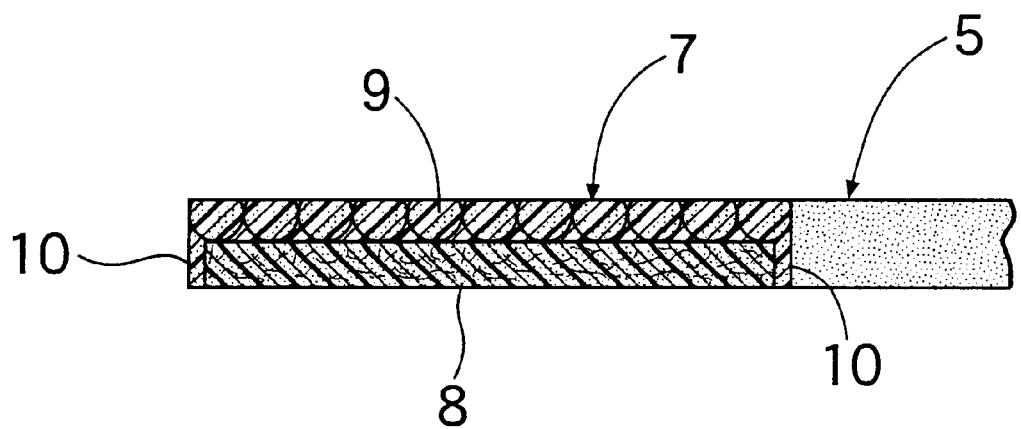
FIG. 2 is an enlarged sectional view of a clutch facing, taken along a line 2—2 in FIG .1.
Figure 3:
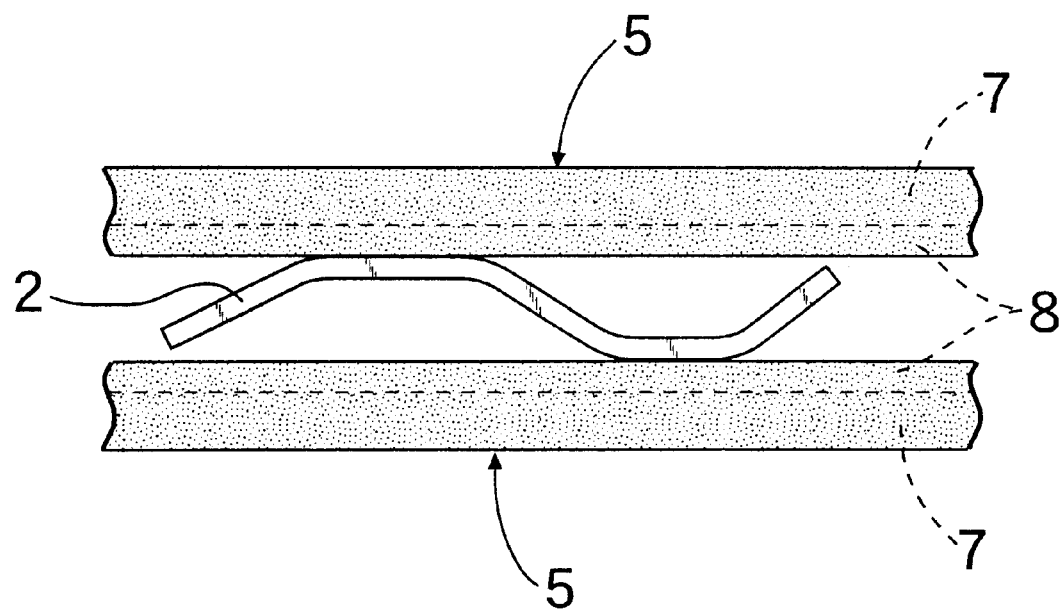
FIG. 3 is a view showing the relationship between the clutch facing and a cushion spring, and corresponding to an enlarged view of a portion indicated by an arrow 3 in FIG. 1.

FIGS. 1 to 3 show a clutch disk 1 of a separate cushion type for a dry friction clutch. In this clutch disk 1, a plurality of cushion springs 2 are disposed annularly around an outer periphery of a disk plate 3 and are fastened to the disk plate 3 through a plurality of rivets 4, and an annular dry clutch facing 5 is fastened to each of opposite surfaces of the cushion spring 2 through a plurality of rivets 6.

Each of the clutch facing 5 is comprised of an annular facing element 7 and an annular reinforcing element 8 bonded to a back of the facing element 7. The facing element 7 comprises a roving 9 as a continuous fiber material which is wound in a volute shape, and which is impregnated with a rubber, a thermosetting resin and a friction-improving agent. The reinforcing element 8 includes a matrix formed of a thermosetting resin, and a reinforcing short fiber dispersed uniformly and at random in the matrix.

In the facing element 7, the roving comprises a glass fiber, a metal fiber or the like, and the rubber, which may be used, is NBR, SBR, IR, BR and the like. Further, the thermosetting resin, which may be used, is a phenol resin, various modified phenol resins, a melamine resin, an epoxy resin and the like, and the friction-improving agent, which may be used, is barium sulfate, calcium carbonate, diatomaceous earth, dolomite and the like. On the other hand, the reinforcing short fiber and the thermosetting resin in the reinforcing element 8 may be those identical to the fiber and the thermosetting resin used in the facing element 7, but another short fiber and another thermosetting resin may be of course used.

When the clutch facing 5 is formed as described above, distortion is hardly generated in the reinforcing element and hence, even when a distortion is generated in the facing element 7, such distortion can be inhibited remarkably due to a backing effect of the reinforcing element 8. In addition, in the clutch disk 1 of the separate cushion type, each of the cushion springs 2 is in contact with the reinforcing element 8 in each of the clutch facings 5, as clearly shown in FIG. 3, and hence, even if a friction contact is produced between the cushion spring 2 and each of the clutch facing 5 under a severe service condition, the wear of each of the clutch facings 5 can be inhibited remarkably. This also applies to a clutch disk of a plate cushion type in which a disk plate 3 itself also serves as a cushion spring.

Further, as clearly shown in FIG. 2, the reinforcing element 8 is formed slightly smaller than the facing element 7, and the inner and outer peripheral surfaces thereof are covered with a filling 10 comprising the rubber, the thermosetting resin and the friction-improving agent. Thus, the reinforcing element 8 is prevented from being exposed to the outside, leading to an enhancement in appearance of the clutch facing 5. Such covering is achieved by superposing preforms for the facing element 7 and the reinforcing element 8 one on another and simultaneously shaping and bonding the preforms to each other, wherein the filling 10 flows out of the perform for the facing element 7.

A process for producing the dry clutch facing 5 will be described below.

A. Production of Preform for Facing Element

Figure 4:
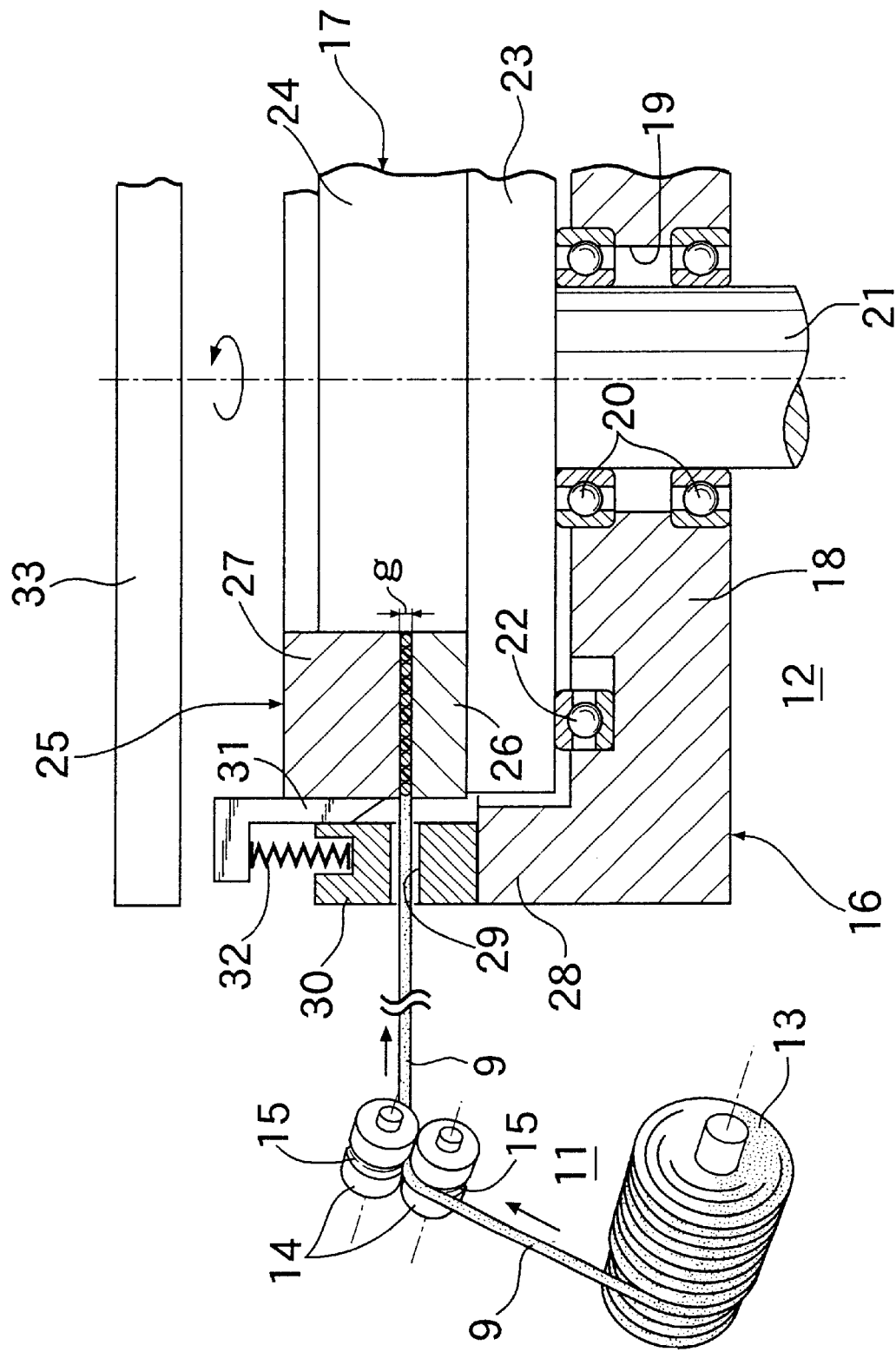
FIG. 4 is a schematic view of an apparatus for producing a preform for a facing element.

An apparatus shown in FIG. 4 for producing a preform for the facing element comprises a material supply section 11 for supplying a roving 9 impregnated with a rubber, an uncured thermosetting resin and a friction-improving agent, and a shaping section 12 for shaping the preform for the facing element by winding the supplied roving 9 spirally into a volute shape and then compressing the wound roving 9.

The material supply section 11 includes a roving roll 13, and a pair of feed rolls 14 for delivering the roving 9 from the roving roll 13 to the shaping section 12. The feed rolls 14 have annular grooves 15 substantially semicircular in cross section and opposed to each other, respectively, so that the roving 9 is shaped to have a substantially circular cross section by virtue of the annular grooves 15.

In the shaping section 12, a core member 17 is rotatably mounted on a horizontal stationary base 16 having a concave sectional shape. The core member 17 comprises a rotary shaft 21 supported in a bearing bore 19 defined in a bottom wall 18 of the stationary base 16 with a plurality of radial bearings 20 interposed therebetween, a circular plate 23 mounted at an upper end of the rotary shaft 21 and supported on an inner peripheral surface of the bottom wall 18 with a thrust bearing 22 interposed therebetween, and a core 24 mounted coaxially on an upper surface of the circular plate 23 and having a diameter smaller than that of the circular plate 23.

An annular shaping member 25 is placed on an annular end surface of the circular plate 23 in such a manner that it is fitted over the core 24. The annular shaping member 25 comprises a lower annular part 26 fixed to the circular plate 23, and an upper annular part 27 which is capable of being lifted and lowered relative to the lower annular part 26 to create a gap g having width substantially equal to the diameter of the roving 9 between the upper and lower annular parts. The upper annular part 27 is rotated along with the core 24 during rotation of the core 24.

A guide member 30 having a through-hole 29 is fixed on a convex edge 28 of the stationary base 16. The guide member 30 guides the roving 9 toward the shaping member 25 by passing the roving 9 through the through-hole 29. A cutter 31 for cutting a wound end of the roving 9 is provided on the guide member 30. The cutter 31 is usually located in a lifted position under the action of a resilient force of a spring 32, so that its cutting edge lies in a position out of a passage of the roving 9 and its upper end lies above the upper annular part 27.

A pressing plate 33 is liftably and lowerably disposed above the upper annular part 27 and the cutter 31, so that the cutter 31 and the upper annular part 27 are urged by the lowering movement of the pressing plate 33.

To produce the preform, the roving 9 delivered from the roving roll 13 and shaped by the pair of feed rolls 14 is passed through the through-hole 29 in the guide member 30, and a leading end of the roving 9 is fixed to the core 24 (or an inner periphery of the lower annular part 26) in a state in which the upper annular part 27 has been lifted. Then, the upper annular part 27 is lowered to create the gap g having the width substantially equal to the diameter of the roving 9 between the upper and lower annular parts 27 and 26, and then fixed at such a location.

Then, the roving 9 is delivered from the roving roll 13, and the core member 17 and the shaping member 25 are rotated to wind the roving 9 spirally into a volute shape around the core 24 in the gap g between the upper and lower annular members 27 and 26 of the shaping member 25. When the roving 9 wound in the volute shape fills the gap g, the rotation of the core member 17 is stopped.

Figure 5:
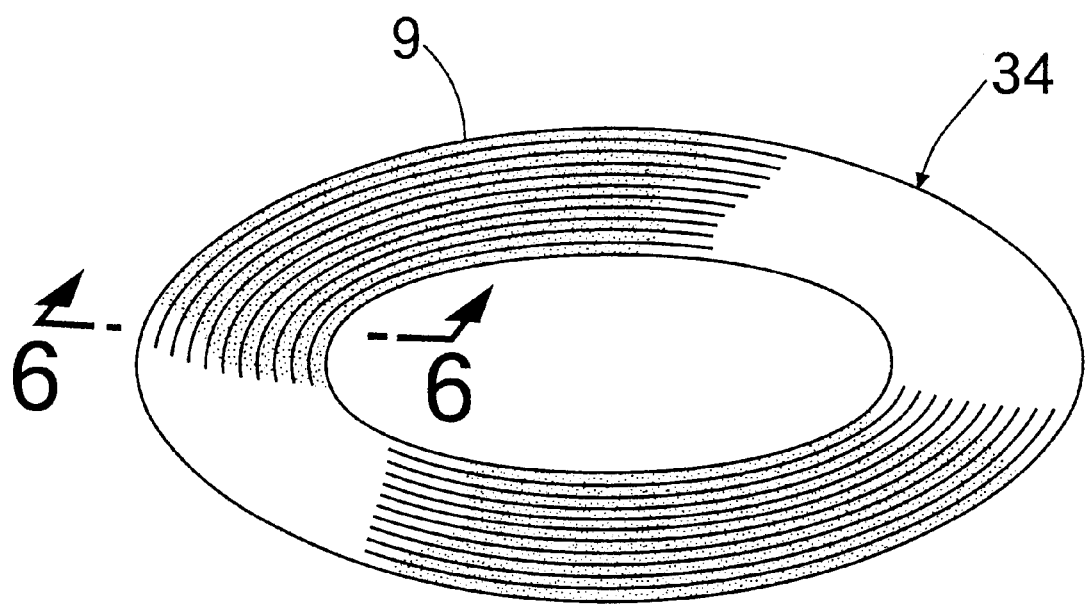
FIG. 5 is a perspective view of the preform for the facing element.
Figure 6:
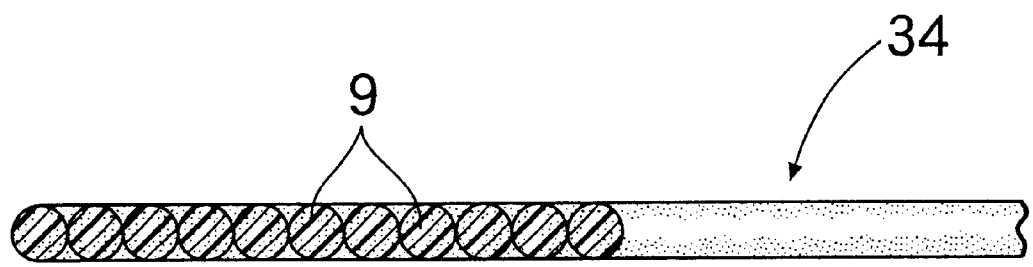
FIG. 6 is an enlarged sectional view taken along a line 6—6 in FIG. 5.

Thereafter, the wound end of the roving 9 is located below the cutter 31. Then, the pressing plate 33 is lowered, whereby the cutter 31 is first urged downwards to cut the wound end of the roving 9. The subsequent lowering of the pressing plate 33 causes the upper annular part 27 to be urged downwards and hence, the volute roving 9 is clamped between the upper and lower annular parts 27 and 26, thereby producing an annular preform 34 for the facing element, as shown in FIGS. 5 and 6.

B. Production of a Preform for Reinforcing Element

The preform is produced by the following procedure: an annular accumulated material comprised of chopped strands as a reinforcing short fiber and a resin powder as an uncured thermosetting resin is produced. Then, the annular accumulated material is heated in a compressed state, whereby the temperature of the resin powder is raised to a level near its melting point. The heating is achieved by utilizing a high-frequency induction heating process capable of rapidly raising the temperature of the resin powder. This is effective for enhancing the operating efficiency.

Figure 7:
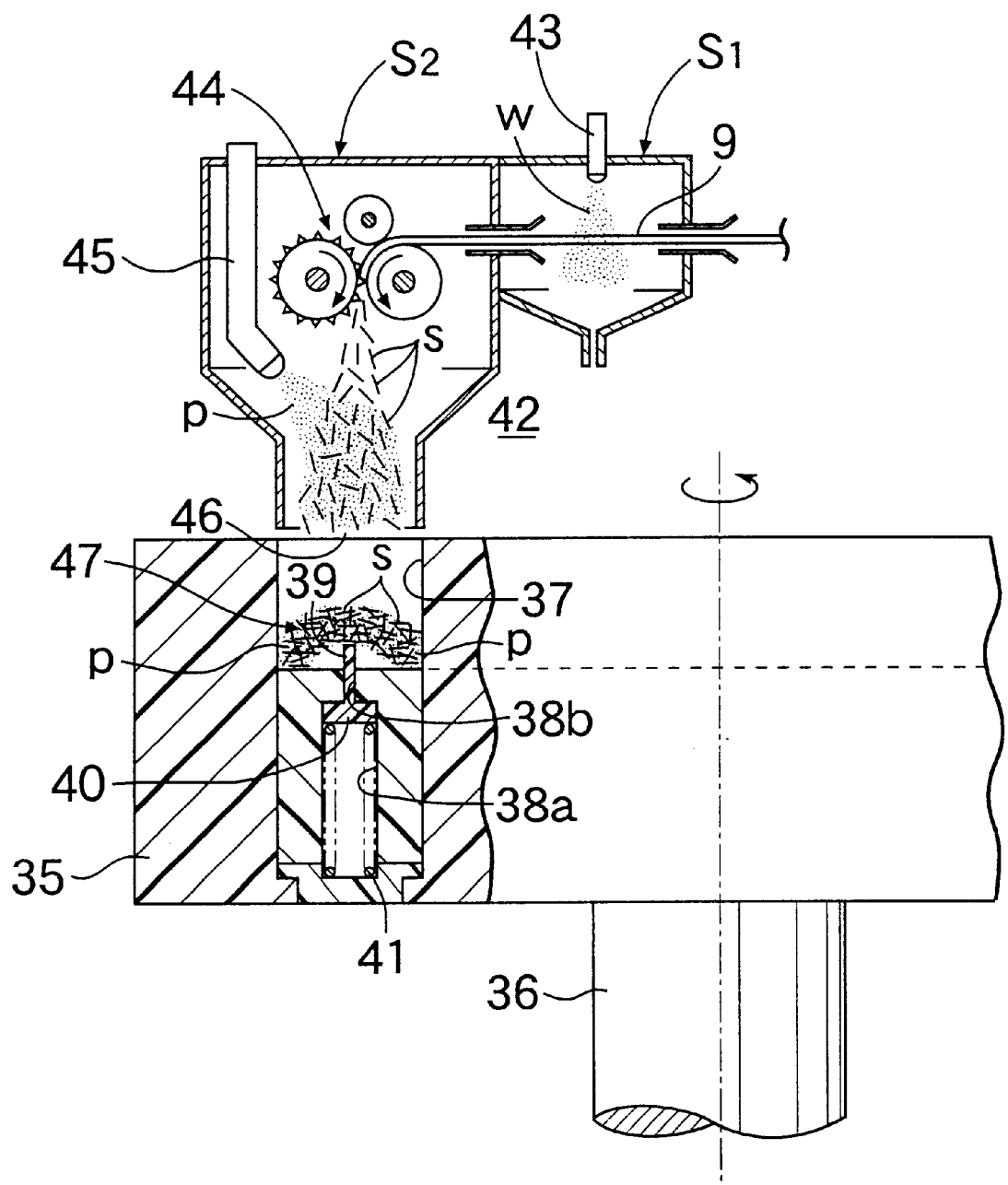
FIG. 7 is a schematic view of an apparatus for producing an annular accumulated material used for the production of a preform for a reinforcing element.

In an annular accumulated material producing apparatus shown in FIG. 7, a horizontal circular plate 35 made of a synthetic resin is rotatably supported on a support member (not shown) through a shaft 36. The horizontal circular plate 35 has an annular groove 37 which opens upwards.

Provided in a bottom wall of the annular groove 37 are an annular bore 38a and an annular slit 38b permitting the communication between the annular bore 38a and the annular groove37. An annular equalizer plate 39 is vertically slidably disposed in the annular slit 38b, and an annular stopper 40 integral with the equalizer plate 39 is vertically slidably disposed in the annular bore 38a. A plurality of coil springs 41 are disposed at circumferentially equal distances between a lower surface of the annular stopper 40 and a bottom surface of the annular bore 38a for normally biasing the equalizer plate 39 upwards. Thus, a tip end of the equalizer plate 39 protrudes slightly from the bottom surface of the annular groove 37.

A supply mechanism 42 is disposed above the circular plate 35 for dropping chopped strands and a resin powder toward the annular groove 37. The supply mechanism 42 includes a first section $S_1$ having a nozzle 43 for spraying water w to the roving (impregnated with no material) 9 which is being transported, and a second section $S_2$ which includes a rotary cutter 44 for cutting the wet roving 9 to produce chopped strands a and a nozzle 45 for spraying a resin powder p to the chopped strands s to mix them. An outlet 46 in the second section $S_2$ is located immediately above the annular groove 37 in the circular plate 35.

In the above-described arrangement, when the circular plate 35 is rotated, and the spraying of water to the roving 9, the cutting of the wet roving 9 by the rotary cutter 44 and the spraying of the resin powder p to the chopped strands s are carried out sequentially, a mixture of the chopped strands s and the resin powder p is dropped from the outlet 46 to the annular groove 37 of the circular plate 35 to produce an annular accumulated material 47. In the annular accumulated material 47, the resin powder is deposited sufficiently on the surfaces of the chopped strands s, because such surface is wet with water.

The uniform and at-random dispersion of the chopped strands s in the annular accumulated material 47 in a circumferential direction of the latter is achieved by controlling the rotational speed of the rotary cutter 44. On the other hand, the chopped strands s are accumulated in a sectional arch-shape in a radial direction of the annular accumulated material 47 within the annular groove 37, because the tip end of the equalizer plate 39 protrudes slightly from the bottom surface of the annular groove 37. When the equalizer plate 39 is finally lowered, until its upper end surface is flush with the inner bottom surface of the annular groove 37, the annular accumulated material 47 becomes flat, whereby the chopped strands a are dispersed radially uniformly and at random.

Figure 8:
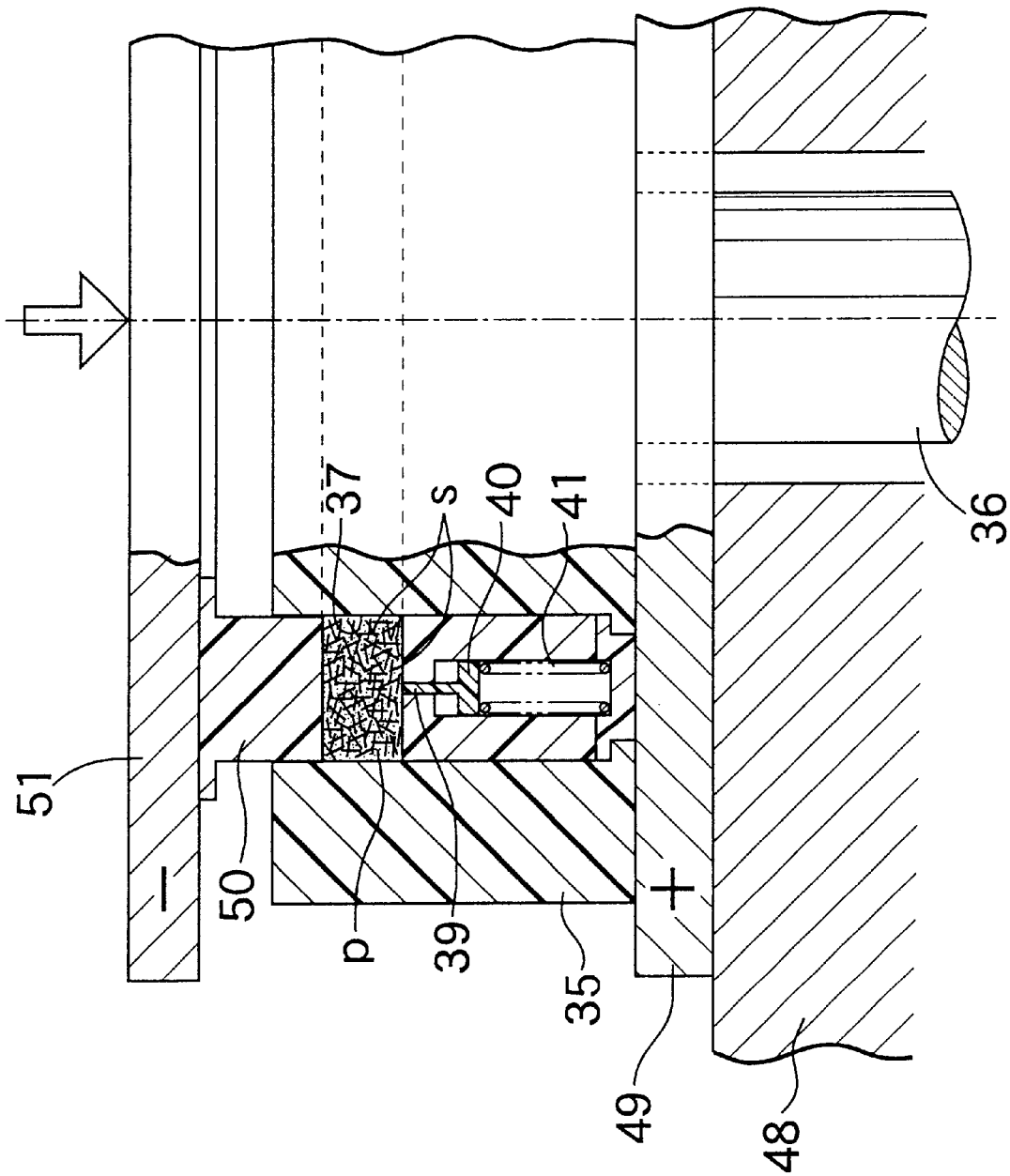
FIG. 8 is a schematic view of an apparatus for compressing and heating the annular accumulated material.

In an apparatus for compressing and heating the annular accumulated material 47 shown in FIG. 8, the circular plate 35 is used as a common component. Namely, the circular plate 35 is placed on a horizontal base 48 with a positive electrode plate 49 interposed therebetween. An annular punch 50 made of a synthetic resin is slidably received in the annular groove 37 in the circular plate 35, and a negative electrode plate 51 is disposed on an upper surface of the punch 50.

Figure 9:
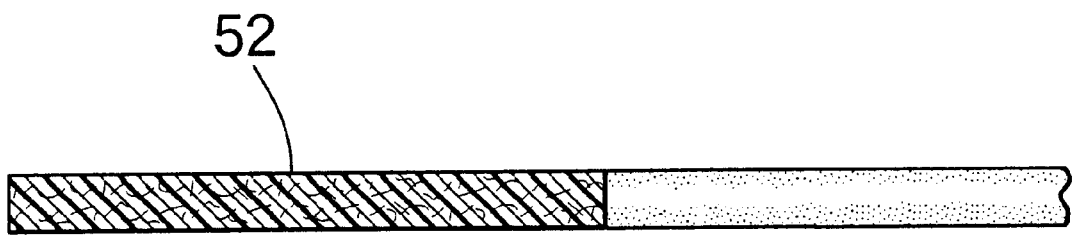
FIG. 9 is an enlarged sectional view of the preform for the reinforcing element, similar to FIG.6.

When a high-frequency voltage is applied between the positive and negative electrode plates 49 and 51 in a state in which the negative electrode plate 51 is pressed by an operating cylinder (not shown) to compress the annular accumulated material 47 by the annular punch 50, the chopped strands s with water deposited thereon is subjected to a high-frequency induction heating with such water serving as a medium, whereby the resin powder p existing in the vicinity of the chopped strands is rapidly heated to near its melting point, thereby providing a preform 52 shown in FIG. 9.

As described above, the water is utilized for both of the deposition of the resin powder p to the chopped strands s and the heating of the resin powder p by the high-frequency induction heating, and moreover, has an effect of preventing the chopped strands s from being charged with a static electricity.

The chopped strands s are dispersed at random and uniformly in the entire preform 52 and hence, it is possible to prevent the variability of mechanical characteristics such as strength in the reinforcing element 8 to equalize the backing effect provided by the reinforcing element 8.

The first section $S_1$ may be used as an electrostatic booth, whereby the roving 9 can be charged with an electrostatic charge opposite from that of the resin powder p to electrostatically depositing the resin powder p to the chopped strands s. A hot pressing process may be employed in place of the high-frequency induction heating process.

C. Production of Clutch Facing

Referring to FIG. 10, a hot press mold 53 comprises a stationary lower die 54, and an upper die 55 which is capable of being lifted and lowered relative to the lower die 54. The preform 52 for the reinforcing element and the preform 34 for the facing element are disposed with the former 52 located below the latter 34 within an annular cavity 56 which is defined in the lower die 54 and which opens upwards. Then, the upper die 55 is fitted into the cavity 56 to heat both of the preforms 34 and 52 under a pressure to completely cure them, thereby producing the facing element 7 and the reinforcing element 8 and at the same time, binding them to each other, thus producing a dry clutch facing 5.

In the above-described process for producing the dry clutch facing 5, it is easy to control the amount of reinforcing element 8 charged. Therefore, even if a variability of amount of facing element 7 charged is liable to be produced, it is easy to control a combination of the amounts, and it is possible to minimize the amount of a flash produced upon the forming and to stabilize the density of the dry clutch facing 5. A yarn may be used as the continuous fiber material.

When a measure using a short fiber or a filament wound diagonally as the fiber material in the facing element 7 is employed, labor is taken, as compared with the case where the roving 9 is wound spirally into a volute shape, resulting in an inevitable increase in manufacture cost, but the problem of the distortion caused by the spiral winding is avoided. However, the problem of the above-described wear of the clutch facing 5 due to its friction contact with the cushion spring 2 remains unsolved.

In such a case, a dry clutch facing 5 is comprised of a facing element 7 which comprises a fiber material impregnated with a rubber, a thermosetting resin and a friction improving agent, and a reinforcing element 8 which includes a matrix made of a thermosetting resin and a reinforcing short fiber dispersed uniformly and at random in the matrix, the reinforcing element 8 being bonded to a back of the facing element 7 and placed in contact with a cushion spring 2.

Although the embodiments of the present invention have been described in detail, it will be understood that the present invention is not limited to the above-described embodiments, and various modifications in design may be made without departing from the subject matter of the invention defined by the claims.

What is claimed is:

1. A process for producing a dry clutch facing formed of a facing element and a reinforcing element, which is bonded to a back of said facing element and for contact with a cushion spring, comprising the steps of:

forming an annular preform for said facing element through a step of winding a continuous fiber material including a rubber, an uncured thermosetting resin and a friction improving agent into a volute shape;

forming an annular preform for said reinforcing element through a step of heating, under a pressure, an annular accumulated material which includes a reinforcing short fiber and a resin powder of an uncured thermosetting resin, said reinforcing short fiber being dispersed uniformly and at random in the entire resin powder;

superposing both said annular preforms one on another and heating the annular preforms under a pressure, thereby producing a facing element and a reinforcing element and at the same time, bonding both said facing and reinforcing elements to each other; and forming said reinforcing element slightly smaller than said facing element, and, through said bonding, covering inner and outer peripheral surfaces of said reinforcing element with a filling comprising the rubber, the thermosetting resin and the friction improving agent of said facing element.

* * * * *